(12) United States Patent
Zarraonandia

(10) Patent No.: US 11,980,835 B2
(45) Date of Patent: May 14, 2024

(54) DOUBLE-FILTER BASKET FOR STORMWATER RETENTION SYSTEM DRAIN

(71) Applicant: Foley Products Company, LLC, Newnan, GA (US)

(72) Inventor: David Zarraonandia, Thousand Oaks, CA (US)

(73) Assignee: Foley Products Company, LLC, Newnan, GA (US)

( * ) Notice: Subject to any disclaimer, the term of this patent is extended or adjusted under 35 U.S.C. 154(b) by 528 days.

(21) Appl. No.: 16/939,245

(22) Filed: Jul. 27, 2020

(65) Prior Publication Data

US 2022/0023778 A1    Jan. 27, 2022

(51) Int. Cl.
| | |
|---|---|
| *B01D 29/58* | (2006.01) |
| *B01D 29/33* | (2006.01) |
| *B01D 29/96* | (2006.01) |
| *B01D 39/08* | (2006.01) |
| *C02F 1/00* | (2023.01) |
| *C02F 103/00* | (2006.01) |

(52) U.S. Cl.
CPC ............ *B01D 29/58* (2013.01); *B01D 29/33* (2013.01); *B01D 29/96* (2013.01); *B01D 39/08* (2013.01); *C02F 1/001* (2013.01); *B01D 2201/605* (2013.01); *B01D 2239/0618* (2013.01); *C02F 2103/001* (2013.01)

(58) Field of Classification Search
None
See application file for complete search history.

(56) References Cited

U.S. PATENT DOCUMENTS

| | | | | | |
|---|---|---|---|---|---|
| 396,040 | A | * | 1/1889 | Hough | E04D 13/158 52/223.7 |
| 748,230 | A | * | 12/1903 | Stout | C02F 1/003 210/291 |
| 853,598 | A | * | 5/1907 | Rile | E04D 13/0409 210/166 |
| 1,654,803 | A | * | 1/1928 | Griffith | E03F 5/046 210/242.1 |
| 1,693,977 | A | * | 12/1928 | Egan | E03F 5/046 210/163 |
| 3,385,039 | A | * | 5/1968 | Burke | B01D 46/2403 210/485 |
| 3,429,473 | A | * | 2/1969 | Boucher | E04H 7/18 52/592.1 |
| 3,799,383 | A | * | 3/1974 | Gerhard | B65D 88/128 220/651 |
| 3,824,933 | A | * | 7/1974 | Lind | B65D 19/0012 108/56.1 |
| 3,861,102 | A | * | 1/1975 | Hodge | E04C 3/30 D25/1 |

(Continued)

*Primary Examiner* — Robert J Popovics
(74) *Attorney, Agent, or Firm* — Lewis Rice LLC

(57) ABSTRACT

A stormwater management system comprising a floor having a drainage opening and a filter. The filter is operatively attached to a portion of the floor adjacent the drainage opening such that the filter covers the drainage opening so that water flowing from the stormwater management system into the drainage opening passes through the filter. The filter has a filter area adapted to permit stormwater to flow therethrough, with the filter area of the filter being at least twice as large as the drainage opening area.

11 Claims, 6 Drawing Sheets

(56) References Cited

U.S. PATENT DOCUMENTS

| | | | | |
|---|---|---|---|---|
| 4,211,543 A * | 7/1980 | Tokar | ............ | F02M 35/02483 55/497 |
| 4,261,823 A * | 4/1981 | Gallagher | ............ | E03F 5/101 210/164 |
| 4,309,292 A * | 1/1982 | Stannard | ............ | B01D 24/4621 210/792 |
| 4,525,273 A * | 6/1985 | Logsdon | ............ | E04D 13/0409 210/166 |
| 4,689,145 A * | 8/1987 | Mathews | ............ | B01D 29/56 210/260 |
| 4,708,523 A * | 11/1987 | Sagefors | ............ | E21D 13/00 405/53 |
| 4,934,404 A * | 6/1990 | DeStefano | ............ | E03B 3/03 137/565.33 |
| 5,133,619 A * | 7/1992 | Murfae | ............ | B01D 24/12 404/5 |
| 5,234,286 A * | 8/1993 | Wagner | ............ | E03B 11/02 220/4.24 |
| 5,282,546 A * | 2/1994 | Bauer | ............ | B65D 90/022 220/567.2 |
| 5,297,895 A * | 3/1994 | Johnson | ............ | E02B 11/00 405/74 |
| 5,316,589 A * | 5/1994 | Krieger, Jr. | ............ | E03F 1/00 210/919 |
| 5,322,629 A * | 6/1994 | Stewart | ............ | E03F 1/00 210/170.03 |
| 5,345,741 A * | 9/1994 | Slater | ............ | E03F 7/02 210/170.03 |
| 5,387,741 A * | 2/1995 | Shuttle | ............ | B09B 1/008 588/259 |
| 5,405,539 A * | 4/1995 | Schneider | ............ | E03F 5/0404 210/170.03 |
| 5,437,698 A * | 8/1995 | Furukawa | ............ | E03F 1/005 52/302.1 |
| 5,495,695 A * | 3/1996 | Elliott, Jr. | ............ | B65D 88/76 52/192 |
| 5,549,724 A * | 8/1996 | Mochida | ............ | B01D 46/2411 55/510 |
| 5,624,552 A * | 4/1997 | Vales | ............ | B09C 1/02 210/170.07 |
| 5,685,887 A * | 11/1997 | Mochida | ............ | F02M 35/024 55/510 |
| 5,707,527 A * | 1/1998 | Knutson | ............ | C02F 1/283 210/170.03 |
| 5,735,304 A * | 4/1998 | Chumley | ............ | E03B 3/02 137/15.01 |
| 5,759,415 A * | 6/1998 | Adams | ............ | E03F 5/125 210/776 |
| 5,779,888 A * | 7/1998 | Bennett | ............ | B01D 29/945 210/170.03 |
| 5,788,848 A * | 8/1998 | Blanche | ............ | E03F 5/14 210/309 |
| 5,810,510 A * | 9/1998 | Urriola | ............ | E02B 11/005 210/170.03 |
| 5,843,306 A * | 12/1998 | Singleton | ............ | B01D 29/15 210/170.03 |
| 5,848,856 A * | 12/1998 | Bohnhoff | ............ | E02B 11/00 405/36 |
| 5,958,096 A * | 9/1999 | Yee | ............ | B01D 46/0002 55/517 |
| 5,980,740 A * | 11/1999 | Harms | ............ | E03F 5/14 210/170.03 |
| 6,004,457 A * | 12/1999 | Singleton | ............ | E03F 5/0401 210/170.03 |
| 6,027,639 A * | 2/2000 | Lenhart, Jr. | ............ | C02F 1/283 210/170.03 |
| 6,059,964 A * | 5/2000 | Strawser, Sr. | ............ | E03F 5/0401 210/489 |
| 6,077,448 A * | 6/2000 | Tran-Quoc-Nam | ... | B01D 17/00 210/519 |
| 6,086,756 A * | 7/2000 | Roy | ............ | B01D 17/0211 210/170.03 |
| 6,092,962 A * | 7/2000 | Lee | ............ | E01F 5/005 405/126 |
| 6,095,718 A * | 8/2000 | Bohnhoff | ............ | E02B 11/00 405/36 |
| 6,120,684 A * | 9/2000 | Kistner | ............ | B01D 21/0042 210/512.1 |
| 6,171,507 B1 * | 1/2001 | Roy | ............ | B01D 29/902 210/745 |
| 6,200,484 B1 * | 3/2001 | McInnis | ............ | E03F 5/0401 210/170.03 |
| 6,241,881 B1 * | 6/2001 | Pezzaniti | ............ | B01D 21/267 210/170.03 |
| 6,261,445 B1 * | 7/2001 | Singleton | ............ | E03F 5/04 210/170.03 |
| 6,277,274 B1 * | 8/2001 | Coffman | ............ | B01D 24/205 210/170.03 |
| 6,315,897 B1 * | 11/2001 | Maxwell | ............ | E03F 1/002 210/170.03 |
| 6,337,016 B1 * | 1/2002 | Alper | ............ | C02F 1/288 210/512.1 |
| 6,350,374 B1 * | 2/2002 | Stever | ............ | B01D 21/0006 210/170.03 |
| 6,379,541 B1 * | 4/2002 | Nicholas | ............ | E03F 5/14 210/170.03 |
| 6,406,218 B1 * | 6/2002 | Olson | ............ | B01D 35/0276 405/36 |
| 6,416,674 B1 * | 7/2002 | Singleton | ............ | E03F 5/105 210/170.03 |
| 6,428,693 B2 * | 8/2002 | Singleton | ............ | E03F 5/0404 210/170.03 |
| 6,428,870 B1 * | 8/2002 | Bohnhoff | ............ | E02B 11/00 52/180 |
| 6,478,954 B1 * | 11/2002 | Turner, Jr. | ............ | E03F 5/12 210/170.03 |
| 6,511,595 B2 * | 1/2003 | Crompton | ............ | B01D 29/945 210/309 |
| 6,524,473 B2 * | 2/2003 | Williamson | ............ | E03F 5/14 210/170.03 |
| 6,533,941 B2 * | 3/2003 | Butler | ............ | E03F 5/0404 210/170.03 |
| 6,547,962 B2 * | 4/2003 | Kistner | ............ | B01D 17/00 210/170.03 |
| 6,602,408 B1 * | 8/2003 | Berkey | ............ | B01D 35/027 210/477 |
| 6,609,852 B2 * | 8/2003 | Wimberger | ............ | E03F 5/0401 210/170.03 |
| 6,626,609 B1 * | 9/2003 | Kotani | ............ | E03F 1/002 210/170.03 |
| 6,638,424 B2 * | 10/2003 | Stever | ............ | B01D 21/0006 210/170.03 |
| 6,641,720 B1 * | 11/2003 | Crompton | ............ | B01D 29/945 210/162 |
| 6,649,048 B2 * | 11/2003 | de Ridder | ............ | E03F 5/125 210/170.03 |
| 6,676,832 B2 * | 1/2004 | de Bruijn | ............ | B01D 21/0006 210/170.03 |
| 6,679,994 B1 * | 1/2004 | Turco | ............ | E03F 5/12 210/791 |
| 6,694,672 B1 * | 2/2004 | Hergeth | ............ | E01C 13/083 47/65.9 |
| 6,749,746 B2 * | 6/2004 | Mokrzycki | ............ | B01D 36/04 210/170.03 |
| 6,779,946 B1 * | 8/2004 | Urriola | ............ | E01C 11/228 405/36 |
| 6,783,683 B2 * | 8/2004 | Collings | ............ | B01D 21/2405 210/801 |
| 6,793,811 B1 * | 9/2004 | Fleischmann | ............ | E03F 1/00 210/170.03 |
| 6,796,325 B1 * | 9/2004 | Courier | ............ | E03F 5/106 52/16 |
| 6,821,445 B2 * | 11/2004 | Miyata | ............ | B01D 24/263 210/275 |
| 6,869,528 B2 * | 3/2005 | Pank | ............ | B01D 24/008 210/170.03 |
| 6,905,599 B2 * | 6/2005 | Allard | ............ | E03F 1/002 210/170.03 |

(56) References Cited

U.S. PATENT DOCUMENTS

| | | | | |
|---|---|---|---|---|
| 6,907,997 B2* | 6/2005 | Thacker | B01D 17/0208 | 210/522 |
| 6,908,548 B1* | 6/2005 | Bruso | C02F 3/1242 | 210/259 |
| 6,922,953 B1* | 8/2005 | Lewis | E03F 1/00 | 211/175 |
| 6,962,464 B1* | 11/2005 | Chen | E01C 11/226 | 405/36 |
| 6,991,402 B2* | 1/2006 | Burkhart | E03F 1/005 | 405/36 |
| 6,998,038 B2* | 2/2006 | Howard | B01D 29/52 | 210/111 |
| 7,001,527 B2* | 2/2006 | Stever | B01D 17/0214 | 210/801 |
| 7,022,243 B2* | 4/2006 | Bryant | B01D 21/0051 | 210/170.03 |
| 7,025,076 B2* | 4/2006 | Zimmerman, Jr. | E03B 1/04 | 405/36 |
| 7,033,496 B2* | 4/2006 | Thacker | B01D 17/0211 | 210/538 |
| 7,041,213 B1* | 5/2006 | McClanahan | E03F 5/18 | 210/170.03 |
| 7,052,207 B1* | 5/2006 | Wimberger | E03F 1/00 | 210/170.03 |
| 7,056,058 B2* | 6/2006 | Urriola | E01C 11/226 | 405/36 |
| 7,080,480 B2* | 7/2006 | Urban | E03F 1/005 | 210/170.03 |
| 7,128,831 B2* | 10/2006 | Newman | E03F 1/002 | 210/163 |
| 7,138,048 B1* | 11/2006 | O'Connor | E03F 5/14 | 210/162 |
| 7,160,058 B2* | 1/2007 | Burkhart | E03F 1/005 | 405/36 |
| 7,160,440 B2* | 1/2007 | Samide | B01D 21/2405 | 210/170.03 |
| 7,182,856 B2* | 2/2007 | Pank | E03F 5/101 | 210/170.03 |
| 7,214,311 B2* | 5/2007 | Aberle | B01D 35/153 | 210/290 |
| 7,270,747 B2* | 9/2007 | Happel | E03F 5/12 | 210/162 |
| 7,288,188 B2* | 10/2007 | Al-Assfour | E03F 5/0406 | 210/170.03 |
| 7,294,256 B2* | 11/2007 | Happel | E03F 5/101 | 210/170.03 |
| 7,344,335 B2* | 3/2008 | Burkhart | E03F 5/101 | 405/36 |
| 7,351,269 B2* | 4/2008 | Yau | A47L 9/20 | 55/296 |
| 7,374,364 B2* | 5/2008 | Allard | E03F 5/0404 | 210/170.03 |
| 7,387,467 B2* | 6/2008 | Kelty | E03F 1/002 | 405/36 |
| 7,396,471 B2* | 7/2008 | Wimberger | E03F 5/0404 | 210/170.03 |
| 7,419,591 B2* | 9/2008 | Aberle | C02F 1/28 | 210/120 |
| 7,422,683 B2* | 9/2008 | Park | B01D 21/267 | 210/170.03 |
| 7,459,090 B1* | 12/2008 | Collings | B01D 21/02 | 210/170.03 |
| 7,465,391 B2* | 12/2008 | Heist | B01D 29/03 | 210/791 |
| 7,470,361 B2* | 12/2008 | Eberly | E03F 5/16 | 210/522 |
| 7,485,218 B2* | 2/2009 | Dussich, I | E03F 1/00 | 210/255 |
| 7,488,414 B2* | 2/2009 | Wimberger | E03F 1/00 | 210/170.03 |
| 7,497,234 B2* | 3/2009 | Robinson | E03F 5/0404 | 210/170.03 |
| 7,503,725 B1* | 3/2009 | Pratt | E03F 1/002 | 210/170.03 |
| 7,517,450 B2* | 4/2009 | Hersey | C02F 1/004 | 210/170.03 |
| 7,534,344 B2* | 5/2009 | Williamson | E03F 5/14 | 210/170.03 |
| 7,540,953 B2* | 6/2009 | Fitzgerald | C02F 1/004 | 210/170.03 |
| 7,582,216 B2* | 9/2009 | Arnott | E03F 5/101 | 210/801 |
| 7,591,610 B2* | 9/2009 | Krichten | E03F 1/005 | 405/53 |
| 7,615,148 B1* | 11/2009 | Gentry | B01D 35/02 | 210/170.07 |
| 7,621,695 B2* | 11/2009 | Smith | E03F 1/005 | 210/170.03 |
| 7,638,065 B2* | 12/2009 | Stever | C02F 1/004 | 210/170.03 |
| 7,638,066 B1* | 12/2009 | Jacob | E03F 5/14 | 210/170.03 |
| 7,645,390 B1* | 1/2010 | McClanahan | E03F 5/18 | 210/744 |
| 7,658,857 B2* | 2/2010 | Wacome | E03F 5/0404 | 210/170.03 |
| 7,677,835 B2* | 3/2010 | Oscar | B65D 90/027 | 405/39 |
| 7,704,011 B2* | 4/2010 | Marshall | E02D 27/02 | 404/34 |
| 7,712,997 B2* | 5/2010 | Roelfsema | E02B 11/00 | 210/170.07 |
| 7,758,747 B2* | 7/2010 | Bryant | B01D 35/303 | 210/170.03 |
| 7,780,855 B2* | 8/2010 | Eberly | E03F 5/16 | 210/747.3 |
| 7,798,747 B1* | 9/2010 | de Bruijn | E01F 5/005 | 405/125 |
| 7,799,235 B2* | 9/2010 | Olson | B01D 29/52 | 210/232 |
| 7,815,800 B2* | 10/2010 | Komatsu | B01D 17/0214 | 210/462 |
| 7,833,412 B2* | 11/2010 | Holtz | E03F 5/14 | 210/170.03 |
| 7,833,413 B1* | 11/2010 | Rotondo | E03F 5/0404 | 210/170.03 |
| 7,875,178 B2* | 1/2011 | Ashliman | B01D 24/007 | 210/477 |
| 7,959,799 B2* | 6/2011 | Happel | E03F 1/00 | 210/166 |
| 7,981,283 B2* | 7/2011 | Happel | E03F 5/14 | 210/162 |
| 7,985,335 B2* | 7/2011 | Allard | E03F 5/0404 | 210/170.03 |
| 7,988,870 B2* | 8/2011 | Belasco | E03F 5/0404 | 210/170.03 |
| RE42,695 E * | 9/2011 | Singleton | E02D 17/20 | 428/221 |
| 8,034,237 B2* | 10/2011 | Happel | E03F 5/12 | 210/170.03 |
| 8,110,105 B2* | 2/2012 | Allen, II | C02F 3/327 | 210/170.03 |
| 8,113,740 B2* | 2/2012 | Boulton | E03B 11/14 | 405/36 |
| 8,123,935 B2* | 2/2012 | Murray | B01D 29/66 | 210/170.03 |
| 8,132,771 B2* | 3/2012 | Lee | B60P 7/08 | 211/49.1 |
| 8,153,004 B2* | 4/2012 | Rodriguez-Jovet | B01D 17/0214 | 210/538 |
| 8,158,010 B2* | 4/2012 | Pearse | E03F 5/125 | 210/799 |
| 8,162,567 B2* | 4/2012 | Obermeyer | E03F 1/002 | 405/53 |
| 8,216,479 B2* | 7/2012 | Lambert, V | E03F 1/002 | 210/170.03 |

(56) References Cited

U.S. PATENT DOCUMENTS

| | | | | |
|---|---|---|---|---|
| 8,221,618 B2* | 7/2012 | Murray | B01D 29/72 | 210/411 |
| 8,240,950 B1 | 8/2012 | Everson | E03B 3/03 | 405/38 |
| 8,287,726 B2* | 10/2012 | Williams | E03F 1/00 | 210/170.03 |
| 8,292,117 B2* | 10/2012 | Guibert | E03F 1/002 | 206/505 |
| 8,323,485 B2* | 12/2012 | Blundell | E03F 1/002 | 210/170.03 |
| 8,360,100 B2* | 1/2013 | Burkhart, Sr. | E03F 1/003 | 210/170.03 |
| 8,366,923 B1 | 2/2013 | Happel | E03F 5/14 | 210/170.03 |
| 8,512,555 B1* | 8/2013 | Allen, II | B01D 24/08 | 210/170.03 |
| 8,535,533 B2* | 9/2013 | Allard | C02F 3/327 | 210/170.03 |
| 8,557,109 B1* | 10/2013 | Sutherland | E03F 5/0404 | 210/163 |
| 8,590,564 B2* | 11/2013 | Burkhart, Sr. | E03F 5/101 | 210/170.03 |
| 8,602,681 B1* | 12/2013 | Masser | E03F 1/005 | 405/43 |
| 8,608,401 B2* | 12/2013 | Gooden | E03F 1/002 | 47/32.7 |
| 8,623,203 B2* | 1/2014 | Peters, Jr. | B01D 29/902 | 210/170.03 |
| 8,658,044 B2* | 2/2014 | Cobb | C02F 1/004 | 210/747.2 |
| 8,679,328 B2* | 3/2014 | Hebert | E03F 5/0404 | 210/163 |
| 8,746,463 B2* | 6/2014 | Cobb | B01D 21/2411 | 210/170.03 |
| 8,747,027 B1* | 6/2014 | Singleton | E02D 3/005 | 405/302.6 |
| 8,753,036 B1* | 6/2014 | Everson | E03B 3/03 | 405/38 |
| 8,753,037 B2* | 6/2014 | Hewing | E02B 11/005 | 405/129.1 |
| 8,770,890 B2* | 7/2014 | May | E03F 5/101 | 405/51 |
| 8,833,708 B2* | 9/2014 | Droomer | E03F 5/101 | 405/59 |
| 8,834,714 B2* | 9/2014 | Chien | E03F 1/00 | 210/166 |
| 8,911,626 B2* | 12/2014 | Allard | E03F 5/0404 | 210/170.03 |
| 8,974,665 B2* | 3/2015 | Vreeland | E03F 5/14 | 210/170.03 |
| 8,985,897 B2* | 3/2015 | Boulton | E03B 11/14 | 405/36 |
| 8,985,903 B1* | 3/2015 | Frith | F16L 1/11 | 405/184.5 |
| 9,045,891 B2* | 6/2015 | Peters, Jr. | B01D 29/902 | |
| 9,057,188 B2* | 6/2015 | Burkhart, Sr. | E03F 5/101 | |
| 9,139,971 B2* | 9/2015 | Parker | E02B 11/005 | |
| 9,206,574 B2* | 12/2015 | Parker | E02B 11/005 | |
| 9,303,365 B2* | 4/2016 | Gooden | E01C 23/00 | |
| 9,359,746 B1* | 6/2016 | Amend | E03F 5/101 | |
| 9,359,755 B2* | 6/2016 | Qin | E03F 5/14 | |
| 9,371,938 B2* | 6/2016 | Miskovich | E04B 5/326 | |
| 9,428,880 B2* | 8/2016 | May | E03F 1/002 | |
| 9,441,355 B2* | 9/2016 | Burkhart, Sr. | E03F 1/002 | |
| 9,464,400 B2* | 10/2016 | May | E02B 11/005 | |
| 9,469,981 B2* | 10/2016 | Allard | E03F 1/00 | |
| 9,506,233 B2* | 11/2016 | Allard | E03F 1/002 | |
| 9,506,235 B2* | 11/2016 | Adams | E03F 1/005 | |
| 9,512,606 B2* | 12/2016 | Allard | E03F 1/002 | |
| 9,540,799 B2* | 1/2017 | Allard | E03F 5/101 | |
| 9,546,044 B2* | 1/2017 | Boulton | E03B 11/14 | |
| 9,580,899 B2* | 2/2017 | Rotondo | B65G 5/00 | |
| 9,593,477 B1* | 3/2017 | Stivers | C02F 3/327 | |
| 9,593,783 B2* | 3/2017 | Parker | E02D 31/02 | |
| 9,604,160 B2* | 3/2017 | Kent | B01D 21/0033 | |
| 9,670,660 B1* | 6/2017 | Moore, Jr. | E03F 1/003 | |
| 9,708,806 B2* | 7/2017 | Meincke | E03F 1/005 | |
| 9,719,240 B1* | 8/2017 | Montague | E03F 5/041 | |
| 9,732,508 B1* | 8/2017 | Kent | E03F 1/005 | |
| 9,732,509 B2* | 8/2017 | Zarraonandia | E03F 1/005 | |
| 9,739,046 B2* | 8/2017 | Miskovich | E03F 1/003 | |
| 9,775,303 B2* | 10/2017 | Ray | E01C 3/06 | |
| 9,896,832 B2* | 2/2018 | Graf | E03F 1/005 | |
| 9,938,697 B1* | 4/2018 | Chen | E01C 9/004 | |
| 9,951,508 B2* | 4/2018 | May | E01F 5/00 | |
| 9,957,987 B2* | 5/2018 | Wandkowski | E02B 11/00 | |
| 9,982,425 B2* | 5/2018 | Vitarelli | E03F 1/003 | |
| 10,053,853 B2* | 8/2018 | Zarraonandia | B28B 7/0029 | |
| 10,113,303 B2* | 10/2018 | Mardian | E03F 5/06 | |
| 10,118,846 B2* | 11/2018 | Holtz | C02F 3/327 | |
| 10,124,281 B2* | 11/2018 | Heilman | E02B 11/00 | |
| 10,132,069 B2* | 11/2018 | Van Der Scheer | E03F 5/101 | |
| 10,151,083 B2* | 12/2018 | Kent | B65G 5/00 | |
| 10,151,096 B2* | 12/2018 | Kent | F17C 3/005 | |
| 10,183,240 B1* | 1/2019 | Happel | E03F 5/108 | |
| 10,197,175 B2* | 2/2019 | Kennedy | E04H 4/14 | |
| 10,238,993 B1* | 3/2019 | Happel | E03F 5/0403 | |
| 10,260,222 B1* | 4/2019 | Happel | C02F 3/104 | |
| 10,267,028 B2* | 4/2019 | May | E03F 5/101 | |
| 10,267,029 B2* | 4/2019 | Kent | E03F 1/002 | |
| 10,285,339 B2* | 5/2019 | Ray | E01C 9/005 | |
| 10,294,640 B2* | 5/2019 | Takai | E03B 3/06 | |
| 10,307,696 B2* | 6/2019 | Kent | B01D 21/0012 | |
| 10,369,496 B2* | 8/2019 | Kent | C02F 1/004 | |
| 10,384,155 B1* | 8/2019 | DiLalla | E03F 5/0404 | |
| 10,415,225 B2* | 9/2019 | Zarraonandia | E03F 5/101 | |
| 10,415,260 B2* | 9/2019 | Gooden | E03F 1/005 | |
| 10,428,510 B1* | 10/2019 | Moore, Jr. | E03F 3/043 | |
| 10,435,880 B1* | 10/2019 | Elliott, Jr. | E01C 11/226 | |
| 10,518,440 B2* | 12/2019 | Kloet | B28B 23/04 | |
| D873,376 S* | 1/2020 | Montague | D23/209 | |
| 10,538,384 B2* | 1/2020 | Crowther | E04H 7/18 | |
| 10,563,392 B2* | 2/2020 | Iorio | C02F 3/046 | |
| 10,570,603 B2* | 2/2020 | Vitarelli | E03F 1/003 | |
| 10,584,471 B2* | 3/2020 | Boulton | E03F 1/002 | |
| 10,597,861 B2* | 3/2020 | Miskovich | E04F 15/123 | |
| 10,612,227 B2* | 4/2020 | Elliott, Jr. | E03F 1/005 | |
| 10,626,580 B2* | 4/2020 | Kent | F17C 3/005 | |
| 10,626,592 B2* | 4/2020 | Dubois | B01D 29/52 | |
| 10,696,573 B2* | 6/2020 | Holtz | E03F 5/16 | |
| 10,718,122 B2* | 7/2020 | Gooden | E01C 3/06 | |
| 10,731,309 B2* | 8/2020 | Adams | E03F 1/005 | |
| 10,738,455 B2* | 8/2020 | Burkhart, Sr. | E03F 1/002 | |
| 10,753,077 B2* | 8/2020 | Coppola | C02F 1/004 | |
| 10,774,516 B2* | 9/2020 | Kent | E03F 1/003 | |
| 10,794,051 B1* | 10/2020 | Happel | E03F 5/0402 | |
| 10,808,390 B2* | 10/2020 | Van Der Scheer | E02B 11/005 | |
| 10,844,588 B1* | 11/2020 | Riley | E03F 5/0404 | |
| 10,858,816 B2* | 12/2020 | Montague | E03F 5/041 | |
| 10,882,772 B1* | 1/2021 | Wensel | E03F 5/101 | |
| 10,918,975 B1* | 2/2021 | Happel | C02F 3/06 | |
| 10,932,421 B2* | 3/2021 | Bowie | E01C 9/005 | |
| 11,008,748 B1* | 5/2021 | Hodge, Jr. | E03F 5/06 | |
| 11,008,766 B2* | 5/2021 | Gooden | E01C 3/06 | |
| 11,041,297 B2* | 6/2021 | Zarraonandia | E03F 1/005 | |
| 11,149,427 B2* | 10/2021 | Kent | E03F 1/005 | |
| 11,155,988 B1* | 10/2021 | Ogorchock | E03F 1/005 | |
| 11,186,978 B2* | 11/2021 | May | E02B 11/005 | |
| 11,186,979 B2* | 11/2021 | Hawken | E03F 1/003 | |
| 11,220,815 B2* | 1/2022 | Kent | E03F 1/002 | |
| 11,253,798 B2* | 2/2022 | Happel | E03F 5/108 | |
| 11,260,321 B2* | 3/2022 | Kent | B01D 21/0033 | |
| 11,298,635 B2* | 4/2022 | Lord | B01D 39/086 | |
| 11,326,336 B2* | 5/2022 | Zarraonandia | E03F 1/002 | |
| 11,346,094 B2* | 5/2022 | Lee | B01D 35/1435 | |
| 11,369,065 B2* | 6/2022 | Ray | A01G 13/0237 | |
| 11,408,162 B2* | 8/2022 | Cashatt | E03F 1/002 | |
| 11,420,880 B2* | 8/2022 | Holtz | B01D 29/52 | |
| 11,459,744 B2* | 10/2022 | Swope | C02F 1/001 | |
| 11,479,487 B2* | 10/2022 | Holtz | B01D 24/24 | |
| 11,492,793 B2* | 11/2022 | Kulick, III | E03F 1/002 | |

(56) References Cited

U.S. PATENT DOCUMENTS

| | | | | |
|---|---|---|---|---|
| 11,499,305 B2* | 11/2022 | Happel | ............... | E03F 5/0404 |
| 11,535,528 B1 | 12/2022 | Hakim | ............... | C02F 1/004 |
| 11,536,017 B2* | 12/2022 | VanHoose | ............... | E03F 5/10 |
| 11,566,411 B2* | 1/2023 | Schorstein | ............... | E03F 1/005 |
| 11,634,917 B2* | 4/2023 | Gooden | ............... | E01C 11/18 |
| | | | | 404/17 |
| 11,639,600 B2* | 5/2023 | Jarrett | ............... | E03F 1/005 |
| | | | | 405/52 |
| 11,655,625 B2* | 5/2023 | Woodrum | ............... | G05D 16/024 |
| | | | | 405/129.5 |
| 11,691,894 B2* | 7/2023 | Figola | ............... | C02F 1/004 |
| | | | | 210/170.03 |
| 11,708,690 B2* | 7/2023 | Singleton | ............... | E03F 5/14 |
| | | | | 210/166 |
| 11,821,222 B2* | 11/2023 | Gooden | ............... | E03F 1/002 |
| 11,851,867 B1* | 12/2023 | Holbrook | ............... | E03F 5/101 |
| 11,877,573 B2* | 1/2024 | Friezner | ............... | E03F 1/002 |
| 11,879,246 B2* | 1/2024 | May | ............... | E03F 1/002 |
| 11,891,764 B2* | 2/2024 | Ogorchock | ............... | E01D 2/02 |
| 11,920,350 B2* | 3/2024 | Iftissen | ............... | E04D 13/0409 |
| 2001/0023842 A1* | 9/2001 | Singleton | ............... | E03F 5/0404 |
| | | | | 210/170.03 |
| 2002/0090267 A1* | 7/2002 | Wimberger | ............... | E03F 5/0404 |
| | | | | 405/36 |
| 2002/0117435 A1* | 8/2002 | Pank | ............... | B01D 24/042 |
| | | | | 210/170.03 |
| 2003/0034286 A1* | 2/2003 | Butler | ............... | E03F 5/0404 |
| | | | | 210/163 |
| 2003/0089652 A1* | 5/2003 | Matsui | ............... | C02F 1/00 |
| | | | | 210/170.03 |
| 2003/0094407 A1* | 5/2003 | de Ridder | ............... | E03F 5/14 |
| | | | | 210/120 |
| 2003/0146144 A1* | 8/2003 | Votel | ............... | B01D 29/27 |
| | | | | 210/348 |
| 2003/0188505 A1* | 10/2003 | Marshall | ............... | E02D 27/02 |
| | | | | 52/606 |
| 2004/0076473 A1* | 4/2004 | Burkhart | ............... | E03F 5/106 |
| | | | | 405/39 |
| 2004/0112807 A1* | 6/2004 | Aberle | ............... | B01D 35/153 |
| | | | | 210/120 |
| 2004/0173522 A1* | 9/2004 | Allard | ............... | E03F 5/0404 |
| | | | | 210/170.03 |
| 2005/0040113 A1* | 2/2005 | Howard | ............... | B01D 29/52 |
| | | | | 210/791 |
| 2005/0100401 A1* | 5/2005 | Urriola | ............... | E01C 11/226 |
| | | | | 404/2 |
| 2005/0155285 A1* | 7/2005 | Urban | ............... | A01G 13/0237 |
| | | | | 47/32.7 |
| 2006/0016767 A1* | 1/2006 | Olson | ............... | B01D 29/15 |
| | | | | 210/323.2 |
| 2006/0034662 A1* | 2/2006 | Burkhart | ............... | E03F 5/101 |
| | | | | 405/36 |
| 2006/0163130 A1* | 7/2006 | Happel | ............... | E03F 5/14 |
| | | | | 210/163 |
| 2006/0207922 A1* | 9/2006 | Dussich | ............... | E03F 5/0404 |
| | | | | 210/164 |
| 2006/0275083 A1* | 12/2006 | Wimberger | ............... | E03F 5/0404 |
| | | | | 405/40 |
| 2007/0025817 A1* | 2/2007 | Sheridan | ............... | E03F 1/002 |
| | | | | 405/52 |
| 2007/0031192 A1* | 2/2007 | Murfin | ............... | E03F 1/002 |
| | | | | 405/53 |
| 2007/0053746 A1* | 3/2007 | Dickie | ............... | E03F 1/003 |
| | | | | 405/48 |
| 2007/0099477 A1* | 5/2007 | Burkhart | ............... | E03F 1/005 |
| | | | | 439/411 |
| 2007/0181197 A1* | 8/2007 | Krichten | ............... | E03F 1/005 |
| | | | | 137/833 |
| 2007/0217866 A1* | 9/2007 | Oscar | ............... | E03F 1/005 |
| | | | | 405/36 |
| 2007/0227094 A1* | 10/2007 | Oscar | ............... | B65D 90/027 |
| | | | | 52/630 |
| 2007/0267418 A1* | 11/2007 | Takai | ............... | E03B 3/03 |
| | | | | 220/567.1 |
| 2007/0274776 A1* | 11/2007 | Urriola | ............... | E01C 9/004 |
| | | | | 403/364 |
| 2007/0289908 A1* | 12/2007 | Williamson | ............... | E03F 5/14 |
| | | | | 210/170.03 |
| 2008/0044231 A1* | 2/2008 | Roelfsema | ............... | E03F 1/005 |
| | | | | 425/149 |
| 2008/0047886 A1* | 2/2008 | Lambert | ............... | E03F 1/002 |
| | | | | 210/170.03 |
| 2008/0166182 A1* | 7/2008 | Smith | ............... | E03F 1/005 |
| | | | | 405/36 |
| 2008/0237100 A1* | 10/2008 | Wimberger | ............... | E03F 5/0401 |
| | | | | 210/163 |
| 2008/0251470 A1* | 10/2008 | Kent | ............... | E03F 1/00 |
| | | | | 210/170.03 |
| 2008/0277326 A1* | 11/2008 | Hersey | ............... | C02F 1/004 |
| | | | | 210/170.03 |
| 2008/0277327 A1* | 11/2008 | Hersey | ............... | B01D 35/147 |
| | | | | 210/170.03 |
| 2009/0039022 A1* | 2/2009 | Belasco | ............... | E03F 5/14 |
| | | | | 210/651 |
| 2009/0045128 A1* | 2/2009 | Murray | ............... | B01D 29/114 |
| | | | | 210/340 |
| 2009/0045149 A1* | 2/2009 | Murray | ............... | B01D 29/72 |
| | | | | 210/393 |
| 2009/0049760 A1* | 2/2009 | Stuck | ............... | B65D 90/027 |
| | | | | 52/169.6 |
| 2009/0050583 A1* | 2/2009 | Arnott | ............... | E03F 5/101 |
| | | | | 210/170.03 |
| 2009/0166278 A1* | 7/2009 | Bryant | ............... | B01D 35/303 |
| | | | | 210/170.03 |
| 2009/0250369 A1* | 10/2009 | Guibert | ............... | E03F 1/002 |
| | | | | 220/608 |
| 2009/0279953 A1* | 11/2009 | Allard | ............... | E03F 1/005 |
| | | | | 405/39 |
| 2009/0282754 A1* | 11/2009 | Watson | ............... | E02D 27/016 |
| | | | | 52/169.6 |
| 2009/0314723 A1* | 12/2009 | Jacob | ............... | E03F 5/14 |
| | | | | 210/170.03 |
| 2010/0021236 A1* | 1/2010 | Kreikemeier | ............... | E03F 1/005 |
| | | | | 405/55 |
| 2010/0051525 A1* | 3/2010 | Jacob | ............... | E03F 5/14 |
| | | | | 210/170.03 |
| 2010/0193418 A1* | 8/2010 | Belasco | ............... | E03F 5/101 |
| | | | | 210/170.03 |
| 2010/0193531 A1* | 8/2010 | Droomer | ............... | E03F 5/101 |
| | | | | 29/428 |
| 2010/0200600 A1* | 8/2010 | Hoekstra | ............... | E03F 1/005 |
| | | | | 220/676 |
| 2010/0221068 A1* | 9/2010 | Burkhart, Sr. | ............... | E03F 1/002 |
| | | | | 405/36 |
| 2010/0226721 A1* | 9/2010 | May | ............... | E01F 5/00 |
| | | | | 405/126 |
| 2011/0108559 A1* | 5/2011 | Hewing | ............... | E03F 1/005 |
| | | | | 220/694 |
| 2011/0147303 A1* | 6/2011 | Allard | ............... | E03F 5/0404 |
| | | | | 210/170.03 |
| 2011/0168612 A1* | 7/2011 | Happel | ............... | B01D 21/003 |
| | | | | 210/122 |
| 2011/0179736 A1* | 7/2011 | Waldron | ............... | E02B 3/12 |
| | | | | 220/567.1 |
| 2011/0186492 A1* | 8/2011 | Holtz | ............... | C02F 1/00 |
| | | | | 210/170.03 |
| 2011/0253238 A1* | 10/2011 | Burkhart, Sr. | ............... | E03F 1/005 |
| | | | | 137/580 |
| 2011/0253641 A1* | 10/2011 | Pearse | ............... | E03F 5/125 |
| | | | | 210/232 |
| 2011/0255921 A1* | 10/2011 | Obermeyer | ............... | E03F 1/002 |
| | | | | 405/45 |
| 2011/0284442 A1* | 11/2011 | Williams | ............... | B01D 29/58 |
| | | | | 210/170.09 |
| 2012/0031854 A1* | 2/2012 | Allard | ............... | E03F 5/14 |
| | | | | 210/163 |
| 2012/0097617 A1* | 4/2012 | Blundell | ............... | E03F 5/0404 |
| | | | | 210/170.03 |

(56) References Cited

U.S. PATENT DOCUMENTS

| | | | |
|---|---|---|---|
| 2012/0141203 A1* | 6/2012 | Gooden | E01C 9/004 404/41 |
| 2012/0152827 A1* | 6/2012 | Allard | C02F 3/327 210/615 |
| 2012/0155963 A1* | 6/2012 | Larach | E03F 1/005 405/52 |
| 2012/0201603 A1* | 8/2012 | Boulton | E03B 11/14 405/36 |
| 2012/0255624 A1* | 10/2012 | Canney | E02B 11/005 137/315.01 |
| 2013/0092632 A1* | 4/2013 | Allard | E03F 1/00 210/170.03 |
| 2013/0126446 A1* | 5/2013 | Kozar | B01D 29/35 210/232 |
| 2013/0152499 A1* | 6/2013 | Kriekemeier | E03F 1/005 405/52 |
| 2013/0193045 A1* | 8/2013 | Vreeland | E03F 5/14 210/170.03 |
| 2013/0264256 A1* | 10/2013 | Hebert | E03F 5/0404 210/163 |
| 2013/0284750 A1* | 10/2013 | Takai | E03F 1/005 220/651 |
| 2014/0041741 A1* | 2/2014 | Burkhart, Sr. | E03F 1/003 137/573 |
| 2014/0041752 A1* | 2/2014 | Jornitz | A61M 39/08 141/85 |
| 2014/0042103 A1* | 2/2014 | Allard | E03F 5/106 210/170.03 |
| 2014/0105684 A1* | 4/2014 | Allard | E02B 11/00 405/52 |
| 2014/0151378 A1* | 6/2014 | Anaya Perez | E04H 7/20 220/565 |
| 2014/0291221 A1* | 10/2014 | Adams | E03F 3/046 210/170.03 |
| 2014/0341653 A1* | 11/2014 | May | E02D 29/10 405/80 |
| 2014/0341654 A1* | 11/2014 | May | E03F 1/002 405/118 |
| 2014/0352729 A1* | 12/2014 | Happel | E03F 5/106 405/36 |
| 2014/0353225 A1* | 12/2014 | Harvey | C02F 1/001 210/170.03 |
| 2014/0367328 A1* | 12/2014 | Allard | E03F 1/002 210/747.2 |
| 2015/0017384 A1* | 1/2015 | Wichmann | E03F 5/0401 428/116 |
| 2015/0033644 A1* | 2/2015 | Mesquita E Silva Ferreira De Araujo | E04B 1/34823 52/220.1 |
| 2015/0041379 A1* | 2/2015 | Kent | C02F 3/04 210/170.03 |
| 2015/0108053 A1* | 4/2015 | Qin | C02F 1/004 210/170.07 |
| 2015/0151914 A1* | 6/2015 | Boulton | B65G 5/00 210/170.03 |
| 2015/0260313 A1* | 9/2015 | Miskovich | B23P 19/00 405/157 |
| 2016/0097175 A1* | 4/2016 | Parker | E03F 1/005 405/184.4 |
| 2016/0116112 A1* | 4/2016 | Bradfield | E03F 1/005 405/126 |
| 2016/0176732 A1* | 6/2016 | Holtz | C02F 3/043 210/170.03 |
| 2016/0265209 A1* | 9/2016 | Graf | E03F 1/005 |
| 2016/0281347 A1* | 9/2016 | Miskovich | E04B 5/36 |
| 2016/0295812 A1* | 10/2016 | Ray | E01C 9/005 |
| 2016/0333562 A1* | 11/2016 | Kimberlain | E03F 1/002 |
| 2016/0333563 A1* | 11/2016 | Zarraonandia | E03F 1/005 |
| 2016/0333564 A1* | 11/2016 | May | E01F 5/00 |
| 2016/0333566 A1* | 11/2016 | Zarraonandia | E03F 5/101 |
| 2016/0348350 A1* | 12/2016 | Burkhart, Sr. | E03F 1/005 |
| 2016/0369490 A1* | 12/2016 | Rotondo | E03F 5/101 |
| 2017/0037610 A1* | 2/2017 | May | E03F 5/101 |
| 2017/0079882 A1* | 3/2017 | Jornitz | B65B 3/003 |
| 2017/0145677 A1* | 5/2017 | Coppola | E03F 5/0404 |
| 2017/0292259 A1* | 10/2017 | Van Der Scheer | E03F 1/002 |
| 2017/0292260 A1* | 10/2017 | Van Der Scheer | E02B 11/005 |
| 2017/0321397 A1* | 11/2017 | Kent | E03B 11/14 |
| 2017/0328051 A1* | 11/2017 | Miskovich | E03F 1/005 |
| 2017/0328052 A1* | 11/2017 | Kent | E03F 1/002 |
| 2017/0347539 A1* | 12/2017 | Ray | A01G 13/0237 |
| 2018/0028950 A1* | 2/2018 | Heilman | B01D 29/15 |
| 2018/0030712 A1* | 2/2018 | Kent | E03F 1/005 |
| 2018/0080201 A1* | 3/2018 | Chen | E03B 3/28 |
| 2018/0080202 A1* | 3/2018 | Chen | E01C 9/004 |
| 2018/0100300 A1* | 4/2018 | Vitarelli | E01F 5/00 |
| 2018/0106029 A1* | 4/2018 | Napierski | E03F 5/125 |
| 2018/0112385 A1* | 4/2018 | VanHoose | E03F 5/10 |
| 2018/0135292 A1* | 5/2018 | Zarraonandia | E03F 1/005 |
| 2018/0238039 A1* | 8/2018 | Vitarelli | E02B 11/00 |
| 2018/0313065 A1* | 11/2018 | Takai | E03B 3/02 |
| 2018/0363283 A1* | 12/2018 | Boulton | B65G 5/00 |
| 2018/0369721 A1* | 12/2018 | Burns | E03F 1/002 |
| 2019/0055725 A1* | 2/2019 | Zarraonandia | E03F 1/005 |
| 2019/0106864 A1* | 4/2019 | Kent | F17C 3/005 |
| 2019/0106873 A1* | 4/2019 | Kent | E03F 1/005 |
| 2019/0145112 A1* | 5/2019 | Gooden | E04G 9/05 404/17 |
| 2019/0177962 A1* | 6/2019 | Montague | E03F 5/0404 |
| 2019/0234059 A1* | 8/2019 | May | E01F 5/005 |
| 2019/0242106 A1* | 8/2019 | Kent | E03F 1/002 |
| 2019/0327916 A1* | 10/2019 | Ray | E01C 9/005 |
| 2019/0360190 A1* | 11/2019 | Kent | F17C 3/005 |
| 2019/0383043 A1* | 12/2019 | Gooden | E01C 9/004 |
| 2020/0011048 A1* | 1/2020 | Kent | E03B 11/14 |
| 2020/0040562 A1* | 2/2020 | Cashatt | E03F 5/10 |
| 2020/0248442 A1* | 8/2020 | Yuki | E03F 1/005 |
| 2020/0256048 A1* | 8/2020 | Crowther | B65D 90/513 |
| 2020/0347619 A1* | 11/2020 | Gooden | E01C 3/06 |
| 2021/0010255 A1* | 1/2021 | VanHoose | E04B 1/04 |
| 2021/0079640 A1* | 3/2021 | Kent | E03F 1/003 |
| 2021/0079641 A1* | 3/2021 | Van Der Scheer | E03F 1/005 |
| 2021/0148105 A1* | 5/2021 | Zarraonandia | E03F 1/005 |
| 2021/0254325 A1* | 8/2021 | Happel | E03F 5/14 |
| 2021/0270049 A1* | 9/2021 | Gooden | E01C 11/226 |
| 2021/0332581 A1* | 10/2021 | Lee | B01D 35/1435 |
| 2021/0381215 A9* | 12/2021 | Cashatt | E03F 5/10 |
| 2021/0396011 A1* | 12/2021 | Takai | E03B 3/03 |
| 2022/0018109 A1* | 1/2022 | Potts | B01D 39/06 |
| 2022/0018110 A1* | 1/2022 | Stromberg | E02D 29/00 |
| 2022/0023778 A1* | 1/2022 | Zarraonandia | B01D 29/96 |
| 2022/0081889 A1* | 3/2022 | May | E01F 5/005 |
| 2022/0112705 A1* | 4/2022 | Zarraonandia | B01D 21/0012 |
| 2022/0127833 A1* | 4/2022 | Kulick, III | E03F 1/005 |
| 2022/0127834 A1* | 4/2022 | Kent | F17C 3/005 |
| 2022/0243447 A1* | 8/2022 | Alexander | E03F 5/101 |
| 2022/0279734 A1* | 9/2022 | Ray | E01C 3/06 |
| 2022/0349170 A1* | 11/2022 | McKnight | C02F 1/004 |
| 2022/0356691 A1* | 11/2022 | Cashatt | E03F 1/002 |
| 2022/0372743 A1* | 11/2022 | Schorstein | E01F 5/005 |
| 2023/0030089 A1* | 2/2023 | VanHoose | E03F 5/10 |
| 2023/0054894 A1* | 2/2023 | Messerschmidt | E03F 1/005 |
| 2023/0056371 A1* | 2/2023 | Larach | E03F 1/005 |
| 2023/0113000 A1* | 4/2023 | Holbrook | E03F 5/14 210/170.03 |
| 2023/0116524 A1* | 4/2023 | Miller | E03F 5/14 405/36 |
| 2023/0157219 A1* | 5/2023 | Richards | E03B 3/02 47/1.01 R |
| 2023/0167635 A1* | 6/2023 | Holbrook | E03F 1/005 210/170.03 |
| 2023/0175246 A1* | 6/2023 | Miller | E03F 1/005 405/36 |
| 2023/0212848 A1* | 7/2023 | Vitarelli | E03F 1/005 405/52 |
| 2023/0220658 A1* | 7/2023 | Pegoraro | E02B 11/005 405/36 |
| 2023/0220688 A1* | 7/2023 | Gooden | E04G 9/05 405/46 |

(56) References Cited

U.S. PATENT DOCUMENTS

| | | | |
|---|---|---|---|
| 2023/0228087 A1* | 7/2023 | Majocka | E04D 13/0409 |
| | | | 285/42 |
| 2023/0235519 A1* | 7/2023 | Schorstein | E03F 3/046 |
| | | | 210/164 |
| 2023/0243142 A1* | 8/2023 | Miller | E03F 1/005 |
| | | | 405/36 |
| 2023/0243143 A1* | 8/2023 | Miller | E03F 1/005 |
| | | | 405/52 |
| 2023/0264977 A1* | 8/2023 | Figola | B01D 29/56 |
| | | | 210/162 |

* cited by examiner

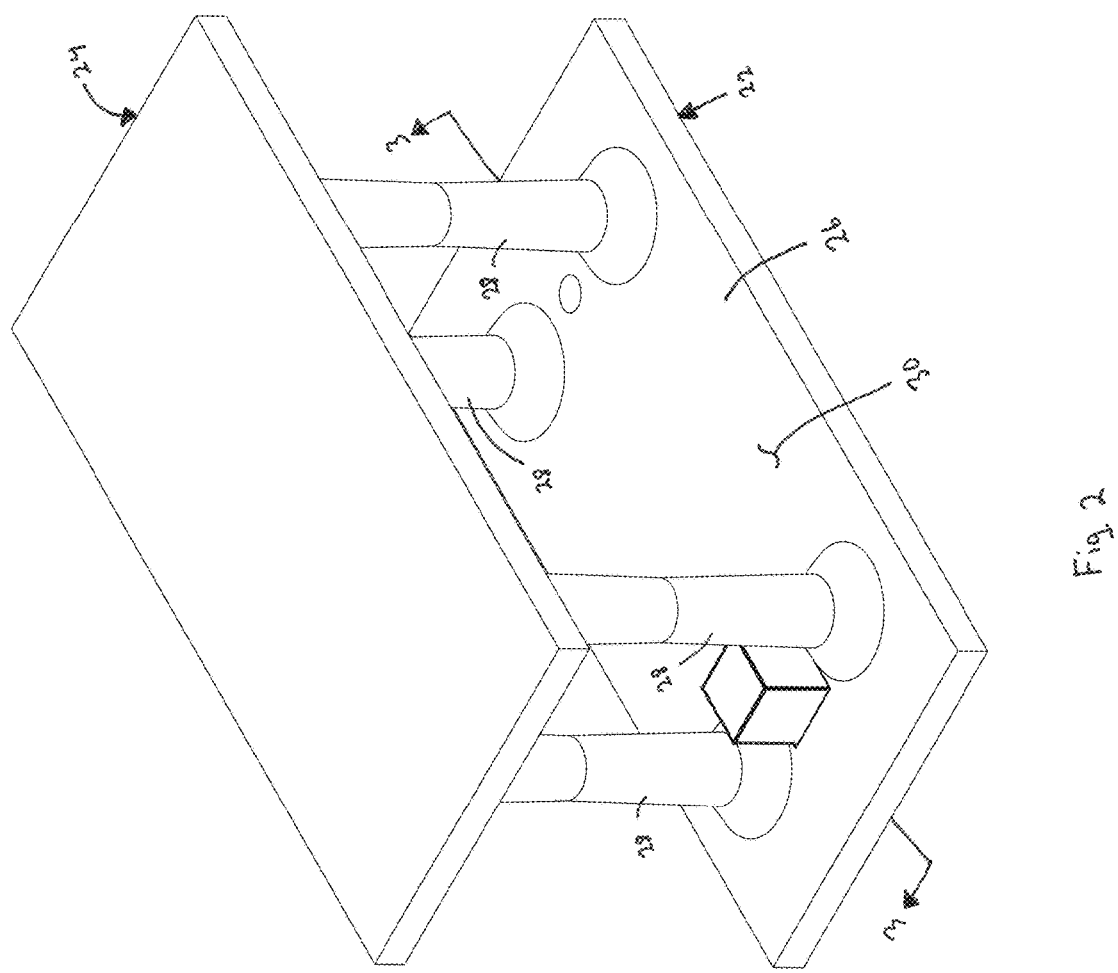

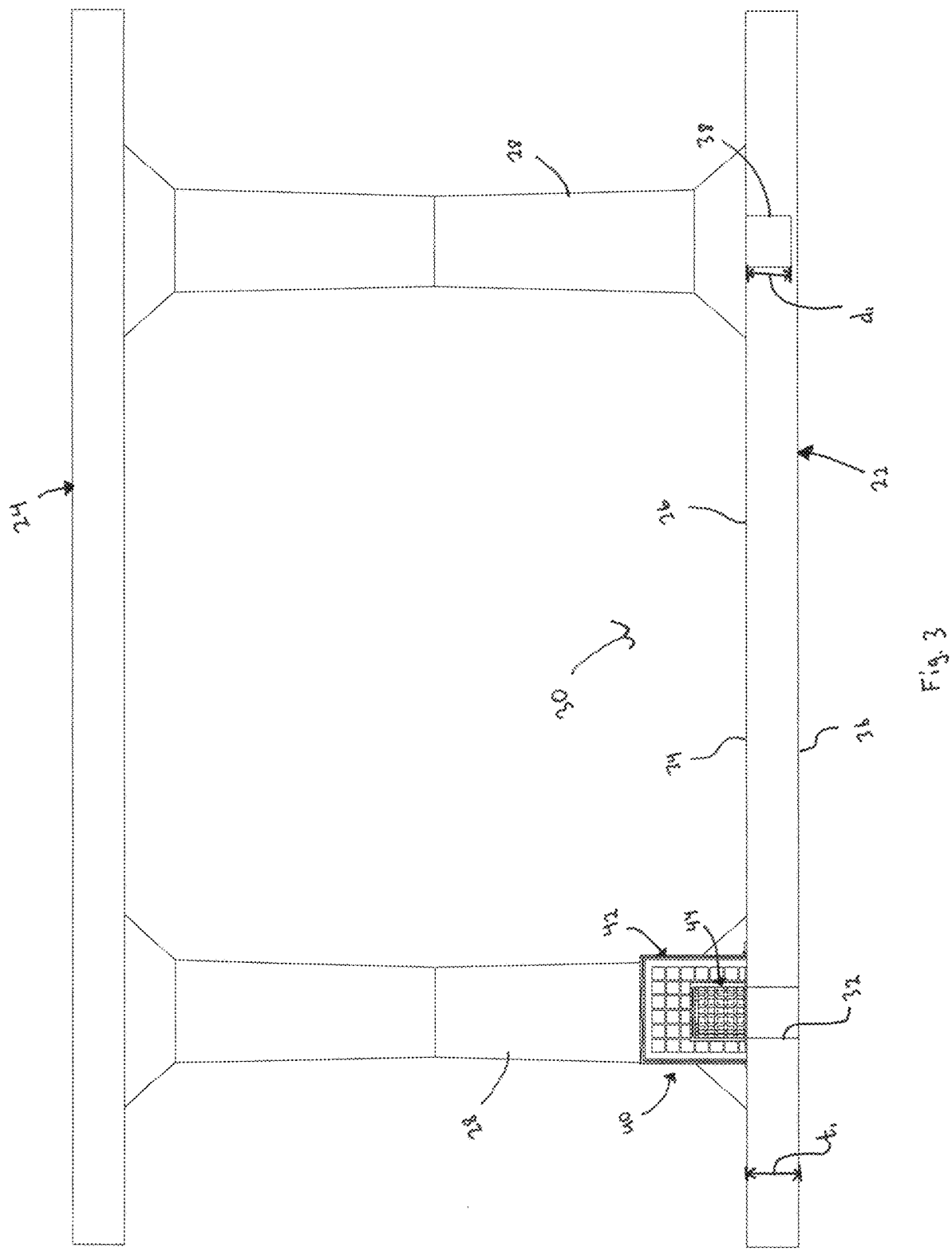

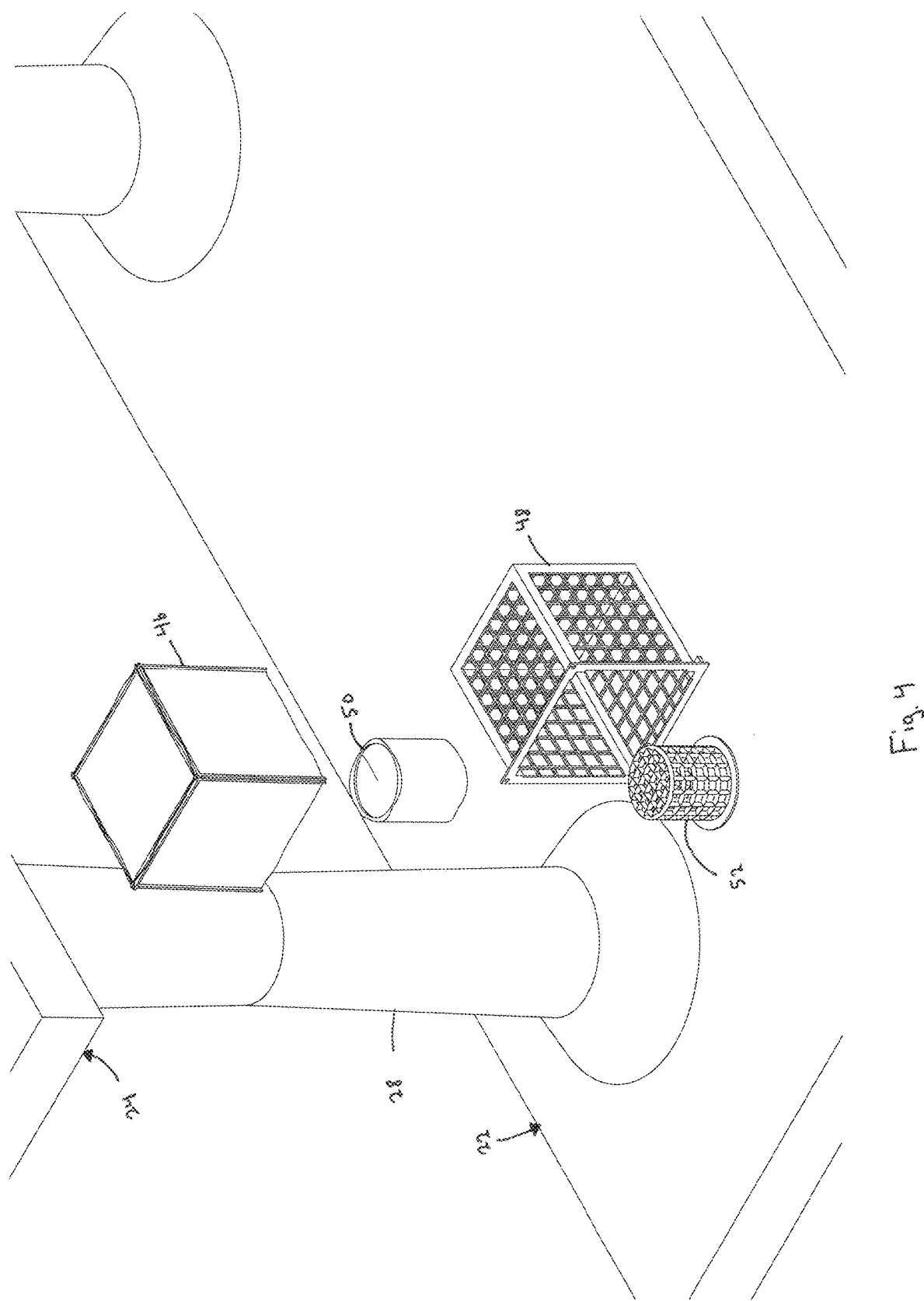

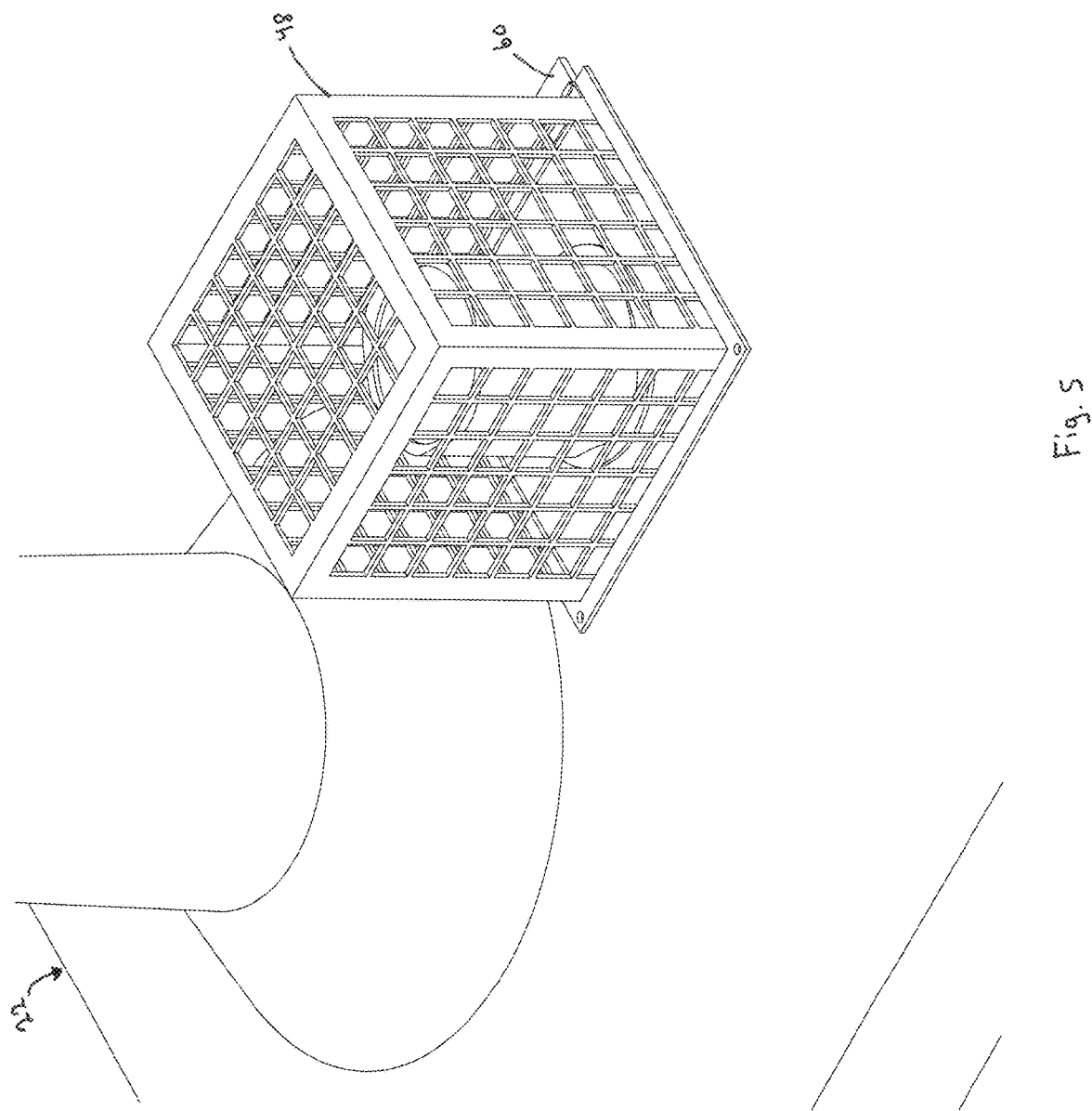

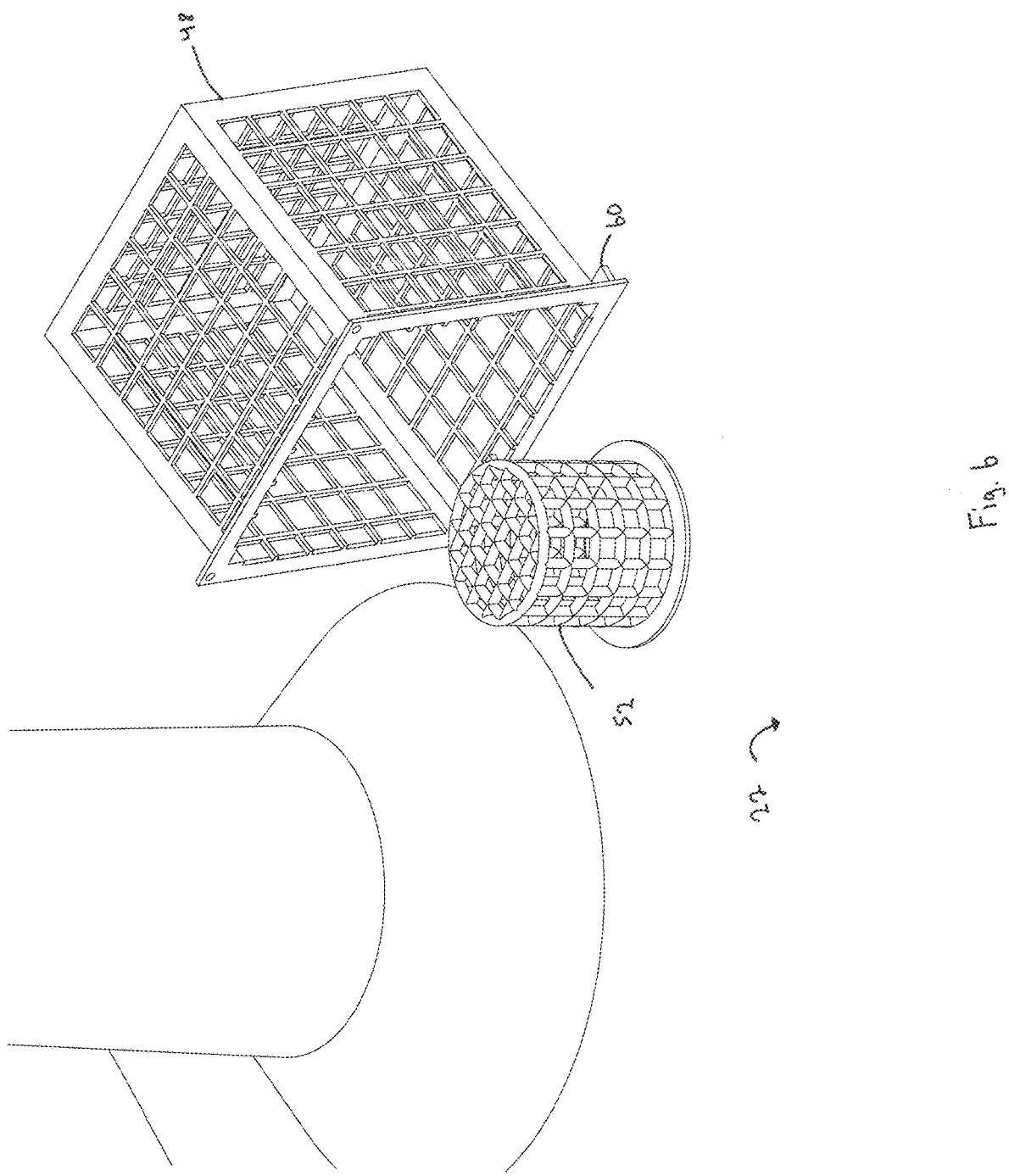

DOUBLE-FILTER BASKET FOR STORMWATER RETENTION SYSTEM DRAIN

CROSS-REFERENCE TO RELATED APPLICATIONS

Not Applicable.

STATEMENT REGARDING FEDERALLY SPONSORED RESEARCH OR DEVELOPMENT

Not Applicable.

APPENDIX

Not Applicable.

BACKGROUND OF THE INVENTION

Field of the Invention

The present invention pertains to a stormwater retention system with a drain filter.

SUMMARY

One aspect of the disclosure is a stormwater management system comprising a floor and a filter. The floor has a drainage opening. The drainage opening has a drainage opening area. The filter is adapted to filter silt or particulate matter from stormwater in the stormwater management system. The filter is operatively attached to a portion of the floor adjacent the drainage opening such that the filter covers the drainage opening so that water flowing from the stormwater management system into the drainage opening passes through the filter. The filter has a filter area adapted to permit stormwater to flow therethrough. The filter area of the filter is at least twice as large as the drainage opening area.

BRIEF DESCRIPTION OF THE DRAWINGS

FIG. 2 is a perspective view of exemplary cells of the stormwater management system of FIG. 1.

FIG. 3 is a cross-sectional view taken along the plane of line 3-3 of FIG. 2.

FIG. 4 is an enlarged, exploded, perspective view of inner and outer drain filter of the stormwater management system of FIGS. 1 and 2.

FIG. 5 is an enlarged perspective view of a double filter embodiment in the covered position.

FIG. 6 is an enlarged perspective view of a double filter embodiment in the uncovered position.

Figure 1:
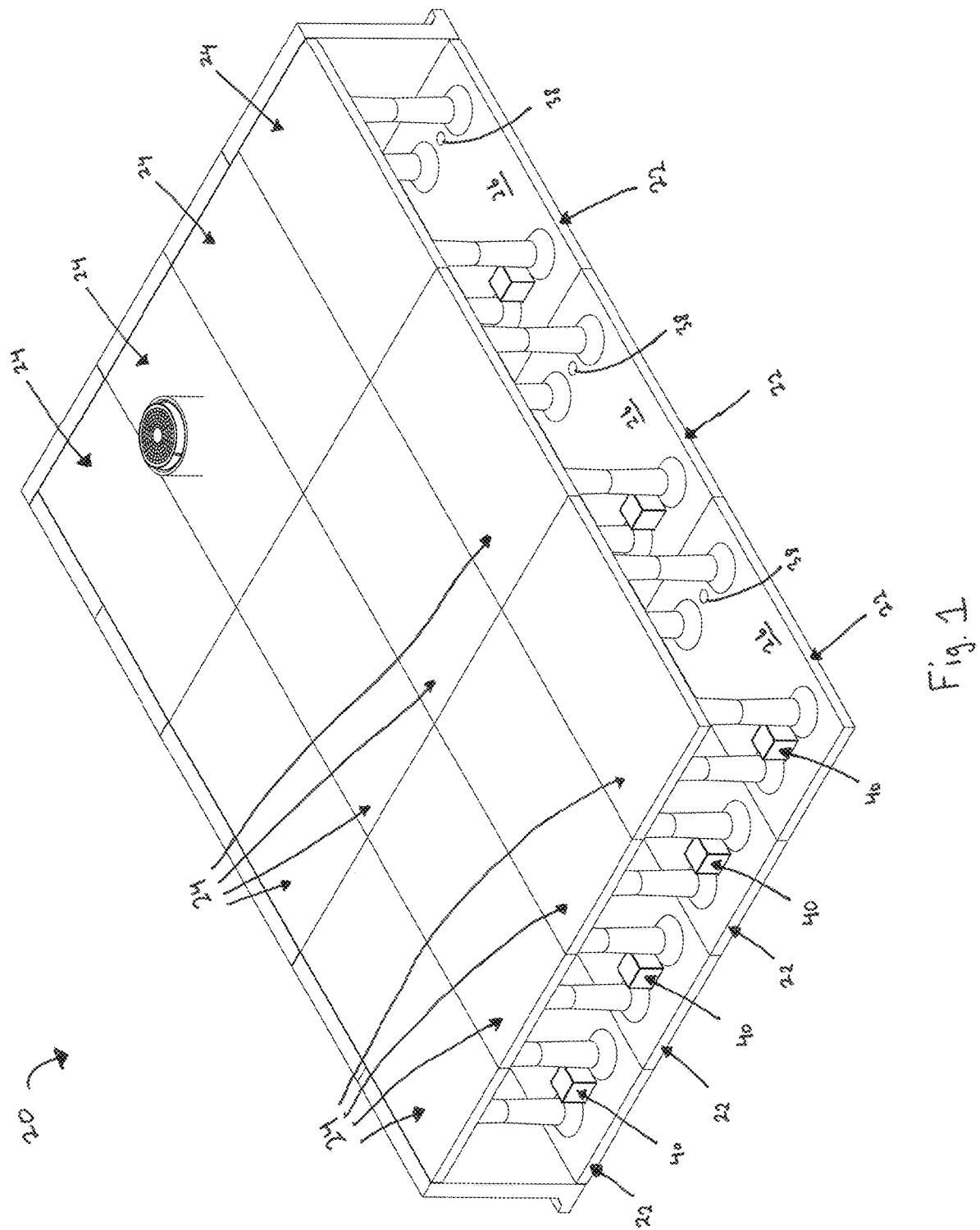
FIG. 1 is perspective view of a partial stormwater management system comprising a plurality of cells.

Reference numerals in the written specification and in the figures indicate corresponding items.

DETAILED DESCRIPTION

FIG. 1 shows a stormwater management system, generally indicated by the reference number 20, comprising a plurality of lower cells 22, and a plurality of upper cells 24. Each cell of the plurality of lower cells 22 is in fluid communication with the other cells in the plurality of lower cells 22 to allow stormwater to flow from one cell of the plurality of lower cells to another cell of the plurality of cells. Each cell of the plurality of upper cells 24 is in fluid communication with the other cells in the plurality of upper cells 24 and with the other cells in the plurality of lower cells 22 to allow stormwater to flow from one cell in the plurality of upper cells to another cell of the plurality of upper and lower cells. As shown in FIGS. 2 and 3, the upper cells 24 are similar to the lower cells 22, but oriented in an inverted manner atop the lower cells. Each lower cell has a floor 26, and one or more (and preferably four) supports 28 (or legs) extending up from the floor 26. Each of the cells 22, 24 may be of reinforced concrete of a unitary molded construction. The floor 26 and supports 28 of each lower cell 22 collectively define a cell internal region 30. The cell internal region 30 of each lower cell 22 is in fluid communication with the cell internal regions 30 of adjacent cells of the plurality of lower cells 22. The floor 26 has at least one drainage opening 32 that permits stormwater to flow from the cell internal region 30.

Referring to FIG. 3, the floor 26 has a floor top surface 34, a floor bottom surface 36, and a floor thickness $t_1$. The floor 26 extends from the floor top surface 34 to the floor bottom surface 36. The floor thickness $t_1$ is defined by the distance between the floor top surface 34 and the floor bottom surface 36.

As shown in FIG. 3, the drainage opening 32 is a through hole. The drainage opening 32 extends from the floor top surface 34 to the floor bottom surface 36, i.e., it has a depth equal to the floor thickness $t_1$. This enables the stormwater to flow from the cell internal region 30 through the floor 26 to drain the stormwater management system 20. The drainage opening 32 has a drainage opening area, which is the cross-sectional area of the drainage opening. Drainage opening diameters may be of various sizes (e.g., eight, ten, or twelve inches) and so drainage opening areas may be of various sizes (e.g., 50.2 in$^2$, or 78.5 in$^2$, or 113 in$^2$).

The floor 26 also has at least one non-through hole 38. The non-through hole 38 extends from the floor top surface 34 to a non-through hole depth $d_1$ that is less than the floor thickness $t_1$. The non-through hole depth $d_1$ must be deeper than half of the floor thickness $t_1$, and preferably greater than 75% of the floor thickness. For example, if the floor thickness $t_1$ is eight inches, the non-through hole depth $d_1$ may be seven inches. The non-through hole 38 is adapted and configured to enable a user to easily increase the non-through hole depth $d_1$ (e.g., by punching out the bottom of the non-through hole)to convert the non-through hole 38 into a drainage opening 32 in the event additional drains are desirable in the stormwater management system 20.

The stormwater management system 20 further comprises a plurality of filter assemblies, generally indicated at 40. Each filter assembly 40 preferably includes an outer filter assembly 42 and an inner filter assembly 44. The outer filter assembly 42 includes an outer filter member 46 and an outer filter basket 48. The inner filter assembly 44 includes an inner filter member 50 and an inner filter basket 52. The outer filter member 46 may be removably attached to outer filter basket 48. The outer filter basket 48 may provide structural support for outer filter member 46 so that the forces caused by stormwater flowing through the stormwater management system 20 do not collapse or displace the outer filter member 46. The outer filter basket 48 is operatively attached to a portion of the floor 26 adjacent the drainage opening 32. More specifically, the outer filter basket 48 may be hingedly attached to a portion of the floor 26 adjacent the drainage opening 32.

The outer filter member 46 has an outer filter area of the outer filter member. The outer filter area is adapted to permit stormwater to flow therethrough. In other words, the outer filter area is the area of the outer filter member 46 through which the stormwater may flow. In the present embodiment, therefore, the outer filter area of the outer filter member 46 is the sum of the areas of the four sides and top of the outer filter member. The outer filter area of the outer filter member is at least twice as large as the drainage opening area, though it is preferably no more than sixty times the drainage opening area. Preferably, the outer filter area of the outer filter member is at least ten times as large as the drainage opening area, and more preferably at least fourteen times as large as the drainage opening area. Having an outer filter area substantially larger than the drainage opening area enables the outer filter member 46 to be partially filled with silt or other particulate matter without impacting the flow rate of the drainage opening 32, thereby allowing for a longer period of continued operation of the storm management system 20 before a need to clean or replace the outer filter member.

The outer filter member 46 may be of a non-woven fabric with an apparent opening size of 100-350 microns. A non-woven fabric with this apparent opening size permits stormwater to flow through the outer filter member 46 while retaining silt or other particulate matter. The non-woven fabric may also be capable of filtering and retaining oil-based fluids from the stormwater as it flows through the outer filter member 46. The non-woven fabric may constitute or comprise, for example, a filter fabric of the type sold under the trademark Adsorb-it®.

The inner filter assembly 44 is between the outer filter assembly 42 and the drainage opening 32 such that stormwater flowing through the outer filter assembly and into the drainage opening passes through the inner filter assembly. The inner filter member 50 may be removably attached to inner filter basket 52. The inner filter basket 52 may provide structural support for the inner filter member 50 so that the forces caused by stormwater flowing through the stormwater management system 20 do not collapse or displace the inner filter member 50.

The inner filter member 50 has an inner filter area. The inner filter area is adapted to permit stormwater to flow therethrough. In other words, the inner filter area is the area of the inner filter member 50 through which the stormwater may flow. The inner filter area is at least twice the size of the drainage opening area, though it is no more than forty times the size of the drainage opening area. Preferably, the inner filter area is at least three times as large as the drainage opening area. More preferably, the inner filter area is at least five times as large as the drainage opening area. Having the inner filter area be substantially larger than the drainage opening area enables the inner filter member 50 to be partially filled with silt or other particulate matter without impacting the flow rate of the drainage opening 32. The outer filter area of the outer filter member must be equal to or larger than the inner filter area.

The inner filter member 50 may constitute or be comprised of a non-woven fabric with an apparent opening size of 100-350 microns. A non-woven fabric with this apparent opening size permits stormwater to flow through the inner filter member 50 while retaining silt or other particulate matter. The non-woven fabric may also be capable of filtering and retaining oil-based fluids from the stormwater as it flows through the inner filter member 50. The non-woven fabric may constitute or comprise, for example, a filter fabric of the type sold under the trademark Adsorb-it®.

The outer filter assembly 42 is operatively attached to a portion of the floor 26 adjacent the drainage opening 32. More specifically, the outer filter assembly 42 is hingedly attached to a portion of the floor 26 adjacent the drainage opening 32.

The inner filter assembly 44 is operatively attached to a portion of the floor 26 adjacent the drainage opening 32.

The outer filter basket 48 is operably secured to the floor 26 adjacent the drainage opening 32 such that it is pivotably secured to the floor 26 via a hinge member 60 for movement of the outer filter basket 48 between a covered position (see FIG. 5) and an uncovered position (see FIG. 6). In its covered position, the outer filter basket 48 covers the inner filter assembly 44 and the drainage opening 32 (see also FIG. 3). With the outer filter basket 48 in its uncovered position, a user may access the inner filter assembly 44. When the outer filter member 46 is attached to the outer filter basket 48 in the covered position, stormwater may flow through the outer filter member 46, through the inner filter member 50, and then through the drainage opening 32. The outer filter member 46 may be removed from the outer filter basket 48. When the outer filter member 46 becomes clogged with silt and particulate matter to the extent fluid flow is undesirably affected, the outer filter member may be removed for cleaning or replacement. Likewise, the inner filter member may be replaced when it becomes clogged.

Although the filter assembly 40 of the present embodiment includes both an outer filter assembly 42 and an inner filter assembly 44, it is to be understood that an alternative filter assembly may include a single filter assembly without departing from the scope of the present invention. In such a case, the single filter assembly may have the form of the outer filter assembly 42, or the form of the inner filter assembly 44, or some alternative form.

In view of the foregoing, it should be appreciated that the invention has several advantages over the prior art.

It should also be understood that when introducing elements of the present invention in the claims or in the above description of exemplary embodiments of the invention, the terms "comprising," "including," and "having" are intended to be open-ended and mean that there may be additional elements other than the listed elements. Additionally, the term "portion" should be construed as meaning some or all of the item or element that it qualifies. Moreover, use of identifiers such as first, second, and third should not be construed in a manner imposing any relative position or time sequence between limitations.

As various modifications could be made in the constructions herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A stormwater management system comprising:
a floor having a drainage opening, the drainage opening having a drainage opening area;
an outer filter assembly and an inner filter assembly;
the inner filter assembly comprising an inner filter basket and an inner filter member, the inner filter basket being operatively secured to the floor, the inner filter member being releasably secured to the inner filter basket, the inner filter member being operatively attached to a portion of the floor adjacent the drainage opening such that the inner filter member covers the drainage opening so that water flowing from the stormwater management system into the drainage opening passes through the inner filter member, the inner filter member having an inner filter area capable of permitting stormwater to flow therethrough, the inner filter area of the inner filter member being at least twice as large as the drainage opening area;

the outer filter assembly comprising an outer filter basket and an outer filter member, the outer filter basket being operatively secured to the floor, the outer filter member being releasably secured to the outer filter basket, the outer filter member being capable of filtering silt or particulate matter from stormwater in the stormwater management system and operatively attached to a portion of the floor adjacent the drainage opening such that the outer filter member covers the inner filter member and covers the drainage opening such that water flowing from the stormwater management system into the drainage opening passes through both the outer and inner filter members, the outer filter member having an outer filter area capable of permitting stormwater to flow therethrough;

wherein the outer filter basket is pivotably secured to the floor for movement of the outer filter basket between a covered position and an uncovered position, the outer filter basket covering the drainage opening in the covered position, the outer filter basket being away from the drainage opening in the uncovered position, the inner and outer filter assemblies being arranged in a manner to enable a user to access the inner filter member for removal from the inner filter basket and replacement with another inner filter member when the outer filter basket is in its uncovered position.

2. The stormwater management system of claim 1 wherein the outer filter area is at least ten times as large as the drainage opening area.

3. The stormwater management system of claim 1 wherein the inner filter area is at least five times as large as the drainage opening area.

4. The stormwater management system of claim 1 wherein the outer filter area is at least ten times as large as the drainage opening area.

5. The stormwater management system of claim 1 wherein the outer filter area of the filter is at least fourteen times as large as the drainage opening area.

6. A stormwater management system comprising:
a floor having a drainage opening, the drainage opening having a drainage opening area;
a filter assembly capable of filtering silt or particulate matter from stormwater in the stormwater management system;
the filter assembly being operatively attached to a portion of the floor adjacent the drainage opening such that the filter assembly covers the drainage opening so that water flowing from the stormwater management system into the drainage opening passes through the filter assembly, the filter assembly having a filter area capable of permitting stormwater to flow therethrough, the filter area of the filter assembly being at least twice as large as the drainage opening area;
a plurality of cells, each cell of the plurality of cells having a floor portion and one or more supports extending upwardly from the floor portion with the floor portion and the one or more supports defining a cell internal region, the cells of the plurality of cells being in fluid communication with one another to allow stormwater to flow from the internal region of one of the plurality of cells to the internal region of another of the plurality of cells, each of the floor portions having a floor top surface, a floor bottom surface, and a floor thickness, each of at least some of the floor portions including a non-through hole extending downward from the floor top surface with the non-through hole having a depth deeper than half the floor thickness to facilitate a user to increase the depth of the non-through hole to convert the non-through hole to a through drainage opening.

7. The stormwater management system of claim 6 wherein the filter assembly constitutes an inner filter assembly and wherein the filter area constitutes an inner filter area, the stormwater management system further comprising an outer filter assembly, the outer filter assembly being capable of filtering silt or particulate matter from stormwater in the stormwater management system, the outer filter assembly being operatively attached to a portion of the floor adjacent the drainage opening such that the outer filter assembly covers the inner filter assembly and covers the drainage opening such that water flowing from the stormwater management system into the drainage opening passes through both the outer and inner filter assemblies, the outer filter assembly having an outer filter area capable of permitting stormwater to flow therethrough.

8. The stormwater management system of claim 7 wherein the outer filter assembly comprises an outer filter member and an outer filter basket, the outer filter member being removably secured to the outer filter basket, the inner filter assembly comprising an inner filter member and an inner filter basket, the inner filter member being releasably secured to the inner filter basket.

9. The stormwater management system of claim 8 wherein the outer filter assembly is pivotably secured to the floor for movement of the outer filter assembly between a covered position and an uncovered position, the outer filter assembly covering the drainage opening in the covered position, the outer filter assembly being away from the drainage opening in the uncovered position, the inner and outer filter assemblies being capable of enabling a user to access the inner filter member for removal from the inner filter basket and replacement with another inner filter member when the outer filter assembly is in its uncovered position.

10. The stormwater management system of claim 6 wherein the filter assembly comprises a filter member and a filter basket.

11. The stormwater management system of claim 10 wherein the filter assembly is pivotably secured to the floor for movement of the filter basket between a covered position and an uncovered position, the filter assembly covering the drainage opening in the covered position, the filter assembly being away from the drainage opening in the uncovered position.

* * * * *